United States Patent [19]
White

[11] 3,743,391
[45] July 3, 1973

[54] SYSTEM FOR DUBBING FRESH SOUND TRACKS ON MOTION PICTURE FILMS

[76] Inventor: Deloy J. White, Andes 51, 20 D.F., Mexico City, Mexico

[22] Filed: May 14, 1971

[21] Appl. No.: 143,503

[52] U.S. Cl. .................................................. 352/5
[51] Int. Cl. .......................................... G03b 31/00
[58] Field of Search .................... 352/5, 12, 19, 20, 352/25, 26, 27, 44, 6, 7, 8, 9, 10; 179/100.2 B

[56] References Cited
UNITED STATES PATENTS

| | | | |
|---|---|---|---|
| 3,049,965 | 8/1962 | Gunst | 352/5 |
| 2,628,288 | 2/1953 | Blaney | 352/27 X |
| 2,092,931 | 9/1937 | Regan et al. | 352/5 X |
| 2,227,201 | 12/1940 | Ross | 352/5 |
| 3,588,375 | 6/1971 | Martin | 179/100.2 |

*Primary Examiner*—Samuel S. Matthews
*Assistant Examiner*—Michael L. Gellner
*Attorney*—Nilsson, Robbins, Wills & Berliner

[57] ABSTRACT

A motion picture produced in one language is provided with a sound track having dialog in another language. A video tape recording is made of the original motion pictue in synchronization therewith and the tape drives a television display while cue information is recorded on the tape, or marked on the motion picture. The tape is played back, and the cue information is used to prompt the recording of the desired sound information, including the dialog in the other language. The recording of the sound information is done in segments and recorded along different laterally displaced longitudinal areas of the tape and juxtaposed to correspond to related image recording. When all of the dialog and other sounds correspond properly with the photographic material, the laterally displaced sound track segments are mixed and balanced to produce a continuous, properly-synchronized sound record. The synchronized sound track (in a new language) is then composed with the optical negative film of the original motion picture.

7 Claims, 3 Drawing Figures

INVENTOR

DELOY J. WHITE

BY
NILSSON, ROBBINS, WILLS & BERLINER.
ATTORNEYS

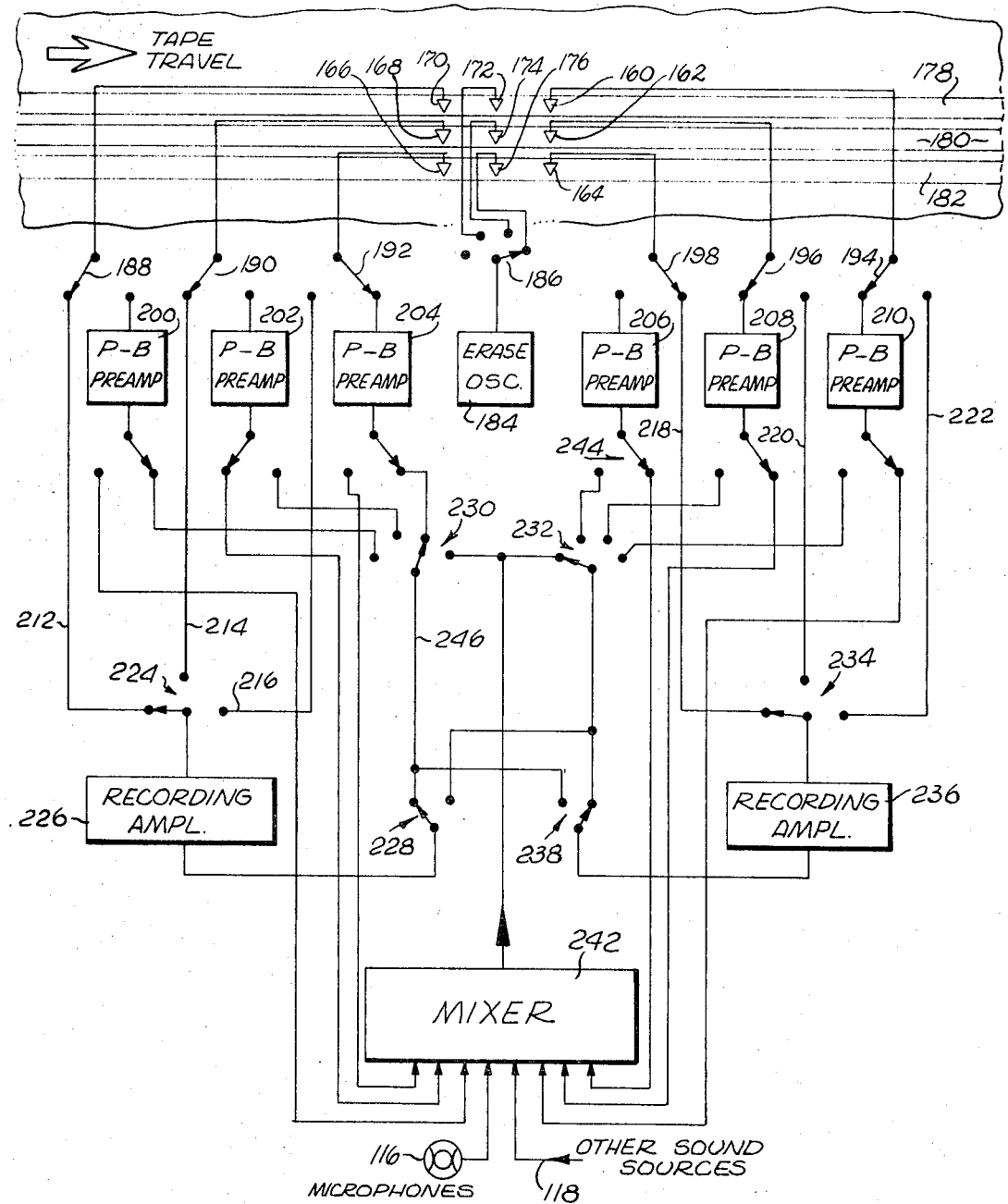

SYSTEM FOR DUBBING FRESH SOUND TRACKS ON MOTION PICTURE FILMS

BACKGROUND AND SUMMARY OF THE INVENTION

Conventional methods of recording a motion picture sound track after the original motion picture has been photographed involves cutting the motion picture film into short sections, the ends of which are spliced to form a plurality of endless loops. The endless loops are repeatedly projected so that actors, sound effects technicians and musicians may produce sound related to and synchronous with the projected image. Such sounds are recorded on loops of sound recording medium e.g. magnetic tape, in synchronism with photographic content of the film. The sound recording medium may be sprocket driven, to assure substantially uniform velocity of both the recorded image and sound information.

After the sound is synchronously recorded on loops highly trained technicians splice the loops of sound recording medium together and relate the result to the motion picture film. This operation is exceedingly tedious and exacting as indicated by the fact that a normal feature-length motion picture film may require the fabrication of as many as 300 to 700 loops with an equal number of magnetic film sound-recording loops.

As a further complication, the above described operations may be repeated to produce separate recordings of three general classifications of sound: voice, music, and sound effects. The separate recordings are subsequently combined in a highly precise operation which may include an electrical interlock. The resultant mixed sound film is then ready to be combined with the related photographic image film onto an optical negative, a process step which is well known in the art.

The tedious and expensive process as described above, is subject to further disadvantages. For example, it is seldom practical to check recordings immediately, so that if errors exist an actor or actors may be required for corrections. However, often an actor is not available, his voice has a slightly different quality thereby resulting in considerable inconvenience.

In converting the sound, i.e. dubbing, video tape, conventionally a motion picture record, i.e. Kinescope, is produced which is cut into loops for processing as described.

According to the present invention, a video tape e.g. magnetic, is used to exhibit the image for use of the actors and technicians to cue themselves for providing the related sound information. The tape can be played back as many times as necessary to accomplish the desired sound record in synchronism with the video. The sound record may be carried in several separate tracks on the video tape.

After each of the segments have been recorded, it is possible to edit by replaying the video tape image together with all of the sound tracks. When the sound record is satisfactory, it may be transferred to a single record and subsequently registered on photographic film.

BRIEF DESCRIPTION OF THE DRAWINGS

In the drawings, which constitute a part of this specification, exemplary embodiments exhibiting various objectives and features hereof are set forth, specifically:

FIG. 3 is a diagrammatic view of an alternate system constructed in accordance with the present invention.

DETAILED DESCRIPTION OF THE ILLUSTRATIVE EMBODIMENTS

Figure 1:
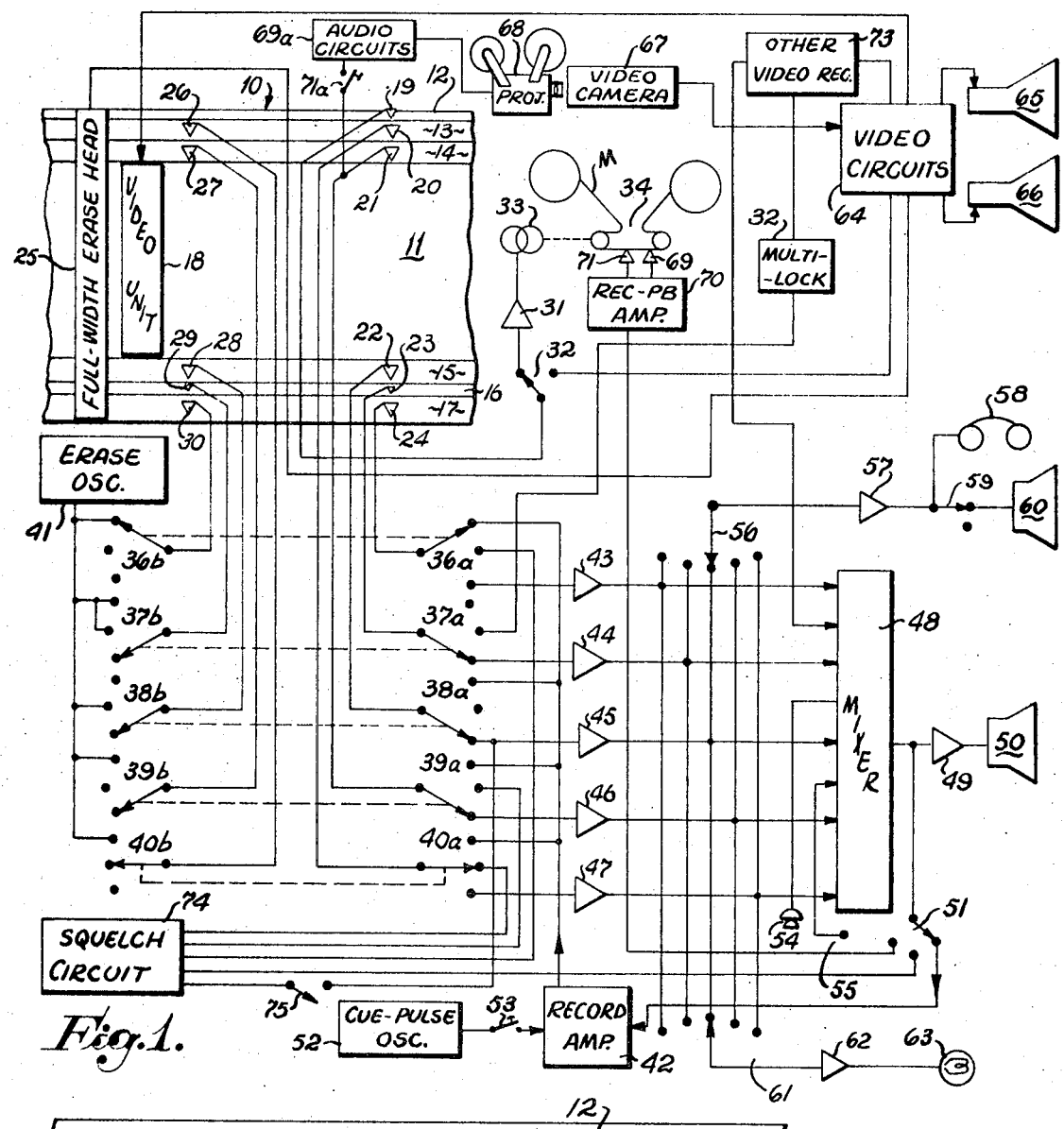
FIG. 1 is a diagrammatic illustration of one form of the system according to the present invention.

Referring to FIG. 1, a section of video tape 10 is illustrated which is utilized in the conversion or revision process hereof. The tape serves to record separate data in separate tracks during the composition operations. Specifically, a central section 11 of the tape 10 records the video while on opposite sides thereof, separate areas serve to record component sounds. Thus, there are provided a plurality of defined tracks, including tracks 12, 13 and 14 along one side of the tape 10 (top as shown) and tracks 15, 16 and 17 along the opposite side of the tape with the video section 11 therebetween. A video record-play unit 18 is associated with the central video section 11 of the tape 10 and record-play heads 19, 20, 21, 22, 23 and 24 are operatively positioned in relation to the tracks 12, 13, 14, 15, 16 and 17 respectively. Each of the tracks is also provided with an associated erase head as indicated, respectively, heads 26, 27, 28, 29 and 30. A full width erase head 25 is also provided to clear the tape 10.

Generally, image content of the film to be converted is recorded on the tape 11. Specifically, the video section 11 of the tape 10 may record a video signal provided from a video camera 67, which signal is processed through video circuits 64 for application to the recording unit 18. The camera 67 receives video content from a projector 68 displaying the frames of the motion picture that is to receive a new sound track. Furthermore, the sound track from the subject film (containing the original language dialog) is recorded in the track 14 for use by the actors as will be understood hereinafter. Specifically, the projector 68 provides an audio signal which is processed by circuits 69 and applied to the recording head 21 through a switch 71.

As with conventional video tape recording apparatus, image control information is provided as sync signals, e.g. certain pulses which occur at a fixed rate having a commensurate relationship with the power line frequency on which the apparatus operates. For example, in the illustrative embodiment, including a video tape recording capability which operates on 60 Hz power, certain pulses (vertical sync) occuring at a 60 Hz rate are recorded in track 12 to be provided for utilization. These frame pulses (vertical sync) and other control information are utilized to assure proper reproduction of the video tape image recording. Accordingly, the frame pulses are applied to an amplifier 31 through a switch 32 and then to a motor 33. The motor 33 is connected to a magnetic recorder to accomplish synchronous movement with the tape 10.

Associated with the various record-play heads and the various erase heads individually connected thereto are a plurality of switch pairs 36, 37, 38, 39 and 40, individual switches being designated by a and b letters. The switches each have plural stable positions. In general, the switches 36b, 37b, 38b, 39b and 40b may connect the erase heads 30, 29, 28, 27, and 26, respectively, to an oscillator 41 for providing a high-frequency erase signal. The switches 36a, 37a, 38a, 39a and 40a may connect the heads (sense-record) 24, 23, 22, 21, 20 and 19, respectively, to amplifiers 43, 44, 45, 46 and 47. As indicated by dashed lines, the similarly-numbered switches may be mechanically interlocked.

All of the play-back amplifiers 43, 44, 45, 46 and 47 are connected to a sound mixer 48 which is of conventional construction and which includes not only apparatus for mixing the sounds from the various tracks, but also for individually controlling the balance equalization and volume thereof as will be well understood by those skilled in the art. The output of the sound mixer is applied through a monitor amplifier 49 to a loudspeaker 50 as may be located in an operator's control booth. The output of the mixer is also connected through a switch 51, to a recording amplifier 42. The recording amplifier 42 has another input from a cue pulse oscillator circuit 52, through a manually operable momentary-contact switch 53, the purpose of which will presently be made apparent.

The sound mixer 48 has inputs (in addition to those inputs from the play-back amplifiers 43, 44, 45, 46 and 47) from various microphones, an exemplary one of which is indicated by the reference character 54, as well as other sound sources as exemplified by the conductor 55. The output of a selected one of the amplifiers 43, 44, 45, 46 or 47 (related to the track previously selected by the operator to carry the sound track from the original program source) is also connected through a selector swtich 56 to a second monitor amplifier 57 the output of which is applied to earphones 58 and through a switch 59 to a speaker 60, both of which are located in the recording studio and are for use by the director and the actors to study timing and artistic expression during rehearsals and prior to actual dubbing of the new language.

After cue signals are recorded on a track selected by the operator through switch 53 by the cue pulse oscillator 52, such cue signals are scanned by the appropriate head 20, 21, 22, 23 or 24, and supplied through a related amplifier 43, 44, 45, 46 or 47 and a multiple-position switch 61 to pulse sensor amplifier 62 where such pulses are amplified for application to a cue light 63.

To complete this system as shown in FIG. 1, there is a standard video tape apparatus amplifier 64 (upper right) containing video record-play and erase means, as well as control circuitry and one output connected to the television monitor indicated by the reference character 65, and another to a separate television monitor 66 for the operator.

In preparing a video tape for use in the system described above, the video image is initially recorded on the portion 11 of the tape 10 while it is displayed on the television monitors 65 and 66, in the presence of the operator, during which time the cue switch 53 is manually depressed at appropriate points during the displayed action, at locations where it is desired to establish the cuing of various sound portions. The video is provided from the circuits 64 to the video record unit 18. For the purpose of illustration, it will be assumed that record-play head 22 was selected by the operator for recording the cue signals. Accordingly, the output of the recording amplifier 42 is connected through the switch 38a to apply cue pulses to the head 22, to produce longitudinally spaced pulses on the track 15. During this cue pulse-recording operation, the original sound track as transferred from the motion picture film (or other source) to be recorded in conjunction with the video image on th portion 11 of the tape 10. Specifically, the audio is supplied from the audio circuits 69 through the switch 71 to the head 21 for recording in the track 14.

With the video recorded in track 11, the cuing signals recorded on the track 15, and the audio on track 14, the tape 10 is ready for dubbing of the sound track. The tape 10 is rewound to its initial position, the switch 38 is moved from the position in which it is connected to the recording amplifier 42 to the position shown in FIG. 1 wherein it is connected, through the amplifier 45 and switch 61, to the pulse sensor amplifier 62 for activation of the cue light 63. The switch 51 (lower right) is placed in the position shown in FIG. 1 where it connects the output of the sound mixer 48 to the recording amplifier 42 so that appropriate record-play heads as selected through the switches 36a, 37a, 38a, 39a or 40a may be energized by one or more microphones 54 or other sound sources such as exemplified by the conductor 55. The erase heads through the switches 36b, 37b, 38b, 39b or 40b are connected to cause erasure of any track selected for connection to the recording amplifier 42.

Figure 2:
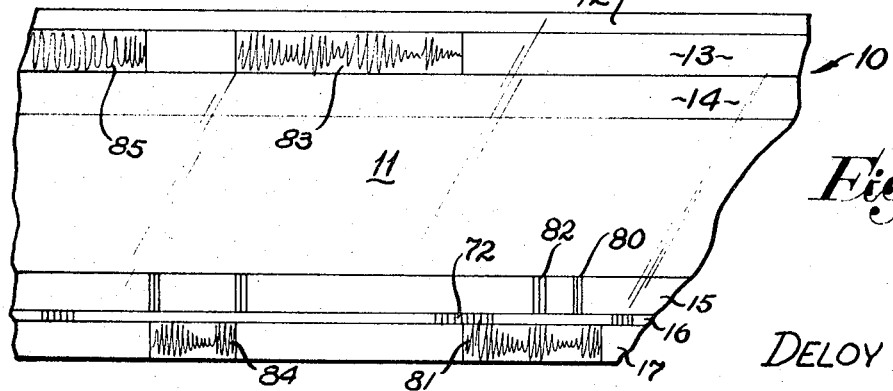
FIG. 2 is a plan view of a fraction of film illustrative of the present system.

The cue pulse on track 15 to be scanned by head 22 is illustrated on a graphic section of tape and is indicated by a reference character 80 (FIG. 2). When the video tape is advanced at normal velocity, the cue pulse is sensed by the head 22, and supplied through the amplifiers 45 and 62 to energize the cue light 63 and the appropriate voice dubbing is then recorded in a segment of the track 17, for example, as indicated by the reference character 81, until the next cue pulse 82 momentarily again lights the cue light 63. While the sound track segment is being recorded in the track 17, the switch 36a is positioned as shown in FIG. 1 where it is connected to the recording amplifier 42. At the end of this segment of sound track recording, which typically will last only a few seconds, the switch 36a is switched to the off position and the switch 40a (connected to the record-play head 20 associated with the sound track 13) is switched from the off position as shown in FIG. 1 to the position where it is connected to the recording amplifier 42 and the next segment of the sound track is recorded, as is indicated by the reference character 83 (FIG. 2). This sequence of operations is repeated throughout the appropriate length of the tape 10 to provide on each of the two tracks 13 and 17 longitudinally separated or spaced segments of the desired sound track.

It will be appreciated that during the above operations, the tape 10 is driven by the usual and conventional fast and normal wind and rewind drive means so that the tape 10 may be shuttled back and forth rapidly for rehearsal and recorded correction of any segment as may be required, for example, to obtain the proper lip synchronization between spoken dialog or other sound being recorded and the image on the TV monitor 65. At any time during the dubbing session, the entire tape containing sound portions recorded in this fashion may be played back displaying the video image on the monitor 65 while both of the switches 36 and 40 are in the playback position wherein they are connected to their respective playback amplifiers 43 and 47 entering the sound mixer 48 the output of which is applied to the amplifier 49 for application to the speaker 50. In this way, the actors, technicians, and director may immediately hear the continuous dialog or other sound track, which, as between the two tracks 13 and 17, represents a continuous and uninterrupted recording which has been properly synchronized with actor lip movement and other motion displayed on the television monitor 65. At this point, any errors noted during this preview session may be corrected immediately by stopping the drive for the tape, rewinding the tape to the appropriate point and correcting the sound track segment which may be in error.

When a satisfactory sound track is carried by the laterally staggered segments on tracks 13 and 17 such as illustrated by reference characters 81, 83, 84 and 85 (FIG. 2), the tape 10 is rewound to the start position and replayed, but, with the switch 51 (FIG. 1) positioned as illustrated to permit the output of the mixer 48 to enter the input of the recording amplifier 42, whereby the content of tracks 13 and 17 (the sound track) enters the recording amplifier 42 for transfer to the sound track 14. For this purpose, the switch 39a is set in the record position connected to the recording amplifier 42 to the head 24. In this manner, the sound contained on tracks 13 and 17 is separately amplified (amplifiers 47 and 43) combined in the mixer 48, applied through the switch 51 to the recording amplifier 42, supplied through the switch 39a to the head 21 so as to be recorded on track 14 in a continuous uninterrupted sound track. The laterally staggered sound track portions on tracks 13 and 17 are no longer required since they have been combined on track 14, thereby releasing tracks 13 and 17 for further recording relative to the overall dubbing session.

The foregoing description applied to the dubbing of dialog, either of tracks 13 and 17 also may be utilized for the recording of sounds related to the image on the video tape 10. Such sounds are commonly known as "incidental effects", being those sounds which were interspersed with the original sound track dialog and must be duplicated in order to complete the aural illusion. Since incidental effects normally do not occur as frequently as dialog, they may be recorded on a single track as in the example hereinafter where track 13 is selected for the purpose. Switch 40a is positioned in the record position to connect the recording head 20 to record amplifier 42 and switch 40b to connect the erase head 26 to the erase oscillator 41.

The sound effects technician is located in the studio near microphone 54 surrounded by noise generating means, that is, broken glass, containers of water, bells, buzzers and dummy doors, etc. With switch 51 connecting the output of mixer 48 to the recording amplifier 42, the sound effects generated near microphone 54 are applied to record amplifier 42 and recorded on track 13 through the switch 40a and the head 19. Errors in the proper synchronization of recorded effects and related image are immediately corrected by reversing the tape 10 to a silent portion of the effects track 13, preceding the point of error, and repeating the recording of the effect as erase head 26 deletes the incorrect recording. At the points where particular effects need to be recorded, cue marks may have been established as described above by proper manipulation of cuing switch 53 after proper positioning of switch 37a as heretofore described.

At the end of the above-described sessions for the dubbing and recording of dialog and incidental effects, and with the examples given for track selection, the video tape 10 contains the total dialog on track 14 and the incidental effects on track 13.

Music for motion picture and like programs is generally recorded by the producer on a carrier such as magnetic film together with certain primary sound effects separate from the dialog. This recording is known in the art as the "international track" or "music and effects track" and generally is available during the dubbing. That track tape M is placed on the magnetic recorder/reproducer 34 with its audible start mark positioned over reproduce head 69. A corresponding signal is recorded with the original sound track on track 17 of the video tape 10 enabling simple synchronization. Switches 37a, 38a, and 39a are positioned to an "off" or open position and switch 93 (lower right) is positioned to connect the amplifier 70 to the input 55. The sound output from reproduce head 69 on the magnetic film device 34 enters amplifier 70 and is applied to mixer 48 (through the switch 93) the output of which (through switch 51) enters the recording amplifier 42 from which the signals are recorded on the track 17 by the head 24.

When the video tape 10 is advanced, the control frequency on track 12 enters amplifier 31 through switch 32 to operate motor 33 and drive the magnetic film device 34 at a speed substantially synchronous with the speed of the video tape 10 as the sound track is recorded on track 17 concurrent with erasure by erase head 30 of the original language sound track.

Upon completion of all of the steps hereinabve described, the resultant product is a roll of magnetic video tape containing image information and separate, parallel tracks containing storage recording of the three general classifications of sound, all of which are juxtapositioned on the magnetic medium in fixed timed relationship. This composite roll, containing all needed information, may now be processed through the rerecording step in a manner which will be seen as a vast improvement over prior art methods. The completed tape is once again returned to its original or start position, and the record/play heads 20, 21 and 17 are switched to their appropriate play-back preamplifiers for application to the sound mixer 48. When the video tape 10 is caused to advance, the technicians may listen to the continuous and now superimposed complete sound track over the speaker 50 and make such notations as to balance and mixing conditions as will be required to produce the final composite sound track. After one or more such rehearsals, the tape 10 is again run from the beginning, but with the switch 51 positioned to apply the output of mixer 48 to the input of magnetic film device amplifier 70 so that the composite sound track with the proper balancing and mixing is then transferred to the magnetic film medium on device 34 through recording head 71 as the medium is being synchronously transported in the manner described hereinbefore. Optionally, track 15 may be employed to accept the mixed composite sound by placing switch 51 in position to carry the mixer 48 output into recording amplifier 42 after switch 38 connects head 22 to the recording amplifier 42.

During this recording session, if an error is made, the tape may be stopped immediately, and the tape quickly rewound to a point preceding the error and where there is no sound on any of the tracks being reproduced. The number of passes required to effect such corrections is not important since the erasing circuits for track 15 are cleaning the track each time a repeat pass is made, the switch for the erase head 28 being appropriately established prior to this in the proper position for this purpose. As required, this error correction technique is repeated throughout the rerecording process. Thereafter, the track 15, containing the mixed sound is channeled through the switch 38 to preamplifier 45 and through the mixer 48 and through the switch 51 into the input of the amplifier 70 to record head 71 on the magnetic film recorder 34, which is driven by a synchronous motor 33, powered as described hereinabove by the amplifier 31, which is activated by the frequency signal on control track 12. This assures time-base interlock of the tape to the magnetic film upon which the final mixed sound track is recorded. This latter magnetic record is then composited with the optical negative film of the original motion picture in the conventional manner. Track 16 and associated circuits serve a purpose which will be fully explained hereinafter.

In the re-recording of sound for complex programs such as feature-length motion pictures, the apparatus and method of the present invention are utilized in the manner hereinabove explained, with modifications or extensions as they may be required for the particular problems involved. For example, in such complex re-recording sessions, it is not uncommon for the technicians to use as many as five, six or more dubbers interlocked with the sound outputs thereof channeled through mixers designed to accommodate appropriate numbers of sound sources. This derives from the frequent need or desire, by the personnel involved, to divide sound sources into separate parts. For example, assume a scene in a motion picture program where a variety of related sound effects are required, such as the sound of rain, footsteps and the sound of automobile brakes being applied. In some re-recording sessions, each of these sound elements will have been separately recorded on segments of a medium such as magnetic film, and edited on moviola-type devices such as previously described, in order that each such separate sound magnetic film may be threaded onto a separate sound reproducing dubber in a manner which assures simultaneous play-back of the separate sound elements in timed relationship with other sound elements in the re-recording session and the picture image emanating from a similarly electrically interlocked motion picture projector. To accomplish this purpose, the relatively short segments of separate sound effects material must be edited into position on rolls of material containing no sound, such as blank material commonly called leader stock. Not infrequently, such separate sound segments, representing a real time play-back of only 3 or 4 seconds, are interspersed in one or more positions on a roll of leader stock representing 10 to 30 minutes of real time play-back and each such edited roll containing such separate sound elements must be assigned to a separate electrically interlocked dubber with an appropriate start mark to assure their play-back occurrence as desired.

It can be appreciated that the above-described conventional procedure is time consuming, exacting, and requires the use of a multiplicity of apparatus and considerable material. It can also be seen that the occurrence of errors necessitates the rewind of a multiplicity of sound carrying elements, picture film, and their reestablishment in their start mark positions before a repeat re-recording pass can be made. According to the present invention, preparation of individual physical loops is eliminated, and the required sounds are combined into a single track which is then re-recorded together with dialog and music in the described fashion.

As explained hereinabove, the dubbing of programs which were originally recorded on the video tape medium presents a special group of problems, including the need for first transferring such program recordings to motion picture film in the process known as kinescope. It will be appreciated that utilization of the present invention eliminates the need for kinescope transfer and subsequent mechanical editing of the motion picture product thereof. Since most original video tape program recordings are on 2" tape and in color it will be seen as a practical step to first make a black and white copy of the original video tape and as a further consideration for economy, such tape copy may be made on 1 inch video tape with the familiar helical scanning method and in the familiar Ampex Corporation format, illustrated in an example in FIGS. 1 and 2. With this well known format, track 17 on tape 10 is the location for the recording of the original sound track. Track 12 carries video control information, and track 16 is a narrow track intended to carry certain ancillary information such as signal known as "multilock" 72 which is recorded on a similar track on the original video tape 73 while both such tapes are being transported in their respective machines and while the video, control and sound information from video tape 73 is being recorded on tape 10 in area 11, track 12 and 17 respectively. In this fashion, a common reference track appears on both tapes and this information is used to effect electrical interlock between two video tape machines carrying the separate video tapes which have been prepared in this manner using standard commercial apparatus.

The video tape copy made as described above is then dubbed in the process steps hereinbefore explained, except that a prior transfer made of the original sound on track 17 to track 14 for use as explained and the final mixed sound after the re-recording to track 15 may be returned to track 17 for reproduction on standard commercial video tape apparatus through proper manipulation of the switches as hereinbefore described.

Included in the present invention are means to manufacture the M&E in those cases where no M&E was made during original production and in a manner which will be appreciated as a considerable improvement over systems generally requiring tedious mechanical editing or the expense of a complete new recording of music and effects. Assuming in this example that track 14 contains the original sound track and tracks 13 and 17 contain the laterally staggered dialog recordings in the new language, each of the reproduce heads 20, 21 and 24 is connected through the center positions of switches 36, 39 and 40 to the squelch circuit 74 where the new dialog on tracks 13 and 17 activate the squelch circuit to prohibit passage of dialog from the original sound track carried on track 14 into the recording amplifier 42 through switch 75, preamplifier 45, sound mixer 48 and switch 51. Track 15, through switch 38 and record head 22 records the music and effects from track 14 without the original dialog which was squelched out by the new dialog signals in the manner well known in the FM broadcasting field. Since the new dialog was dubbed in lip synchronization with the image and since the original dialog was obviously in lip synchronization with the image, the effect of the described procedure is to "lift out" original dialog from the original sound track, leaving silent portions on track 15 located longitudinally on the tape in positions corresponding to the new dialog on tracks 13 and 17 which in the recording step replaces the original dialog.

It will be appreciated that the present invention contemplates the recording of considerably more information, in the form of additional sound and pulse tracks than standard commercial video tape apparatus. Furthermore, in some applications of the invention, more tracks than those discussed heretofore may be required. FIG. 3 illustrates a modification in which the utility of available sound tracks is vastly increased, thereby creating the effect of a greater multiplicity of tracks. In the exemplary structure of FIG. 3, three tracks are shown, however, it will by understood that any or all of the available tracks may be accommodated in the same fashion. As illustrated, each track has three longitudinally spaced heads with recording/reproducing heads 160 and 170 spaced apart with an erasing head 172 positioned intermediate and recording/reproducing heads 162, 168, 164 and 166 similarly spaced with erasing heads 174 and 176, respectively, intermediate, and with these three sets of heads being associated with the respective sound track areas 178, 180 and 182. An erase oscillator 184 is connected, through a suitable switch 186 to any one of the erase heads 172, 174 or 176, or to an off position as illustrated whereas the two sets of record-play heads are provided with the associated switches 188, 190 and 192 and, lastly, the three heads 160, 162 and 164 are provided with associated switches 194, 196 and 198. Each switch associated with the record-play heads is positionable either for connection to the series of play-back preamplifiers 200, 202, 204, 206, 208 and 210 or to the respective conductors 212, 214, 216, 218, 220 and 222, as illustrated. The three conductors 212, 214 and 216 associated with the heads 166, 168 and 170 are selectively connectable by means of the switch 224 to the recording amplifier 226, the output of which is selectively connectable by means of the switch 228 to either the switch 230 or the switch 232. Similarly, the three conductors 218, 220 and 222 are selectively connectable by means of the switch 234 to the recording amplifier 236 whose output, through switch 238, is selectively connected to either of the switches 230 or 232. Each of the playback preamplifiers 200-210 has its output connected to a suitable switch 240 either to the mixer 242 or to one or the other of the switches 230, 232.

To illustrate the usefulness of the FIG. 3 circuitry, assume that two of the elements of sound effects information previously discussed, rain noises and foot steps, have been recorded on the tracks 180 and 182 of the tape 10 shown in FIG. 2. When replaying the tape, with the erase switch 186 set in the position shown in FIG. 3, and with the various switches set so as to transfer the information picked up by head 164 on track 182 to the head 168 associated with the track 180, it will be seen that the sound from the track 182 can be picked up and transferred, in time-delayed relation as established by the positioning between the two sets of heads 160, 162, 164 and 166, 168 and 170. For many types of sound effects, this out of synchronization transfer is not detrimental. For example, the two sets of heads mentioned may be postiioned apart in the order of 1" and assuming a tape velocity of 10 inches/second the out of synchronization condition would be approximately 1/10 second delay. However, in critical applications of this modification of the present invention, sound elements which were recorded as described may later be returned to their original positions with the head from which they were originally reproduced using available switching and circuit means as described.

For the transfer as aforementioned, the switch 198 for the head 164 would be connected into the position to the input of the preamplifier 206 and the switch 244 at the output of the preamplifier 206 would be in the position as shown in FIG. 3, being connected to the mixer 242. The switch 230 would be in the position connecting the conductor 246 through the switch 228 to the input of the recording amplifier 226. Lastly, the switch 224 would be in the position connecting the output of the recording amplifier 226 to the conductor 214, and through the switch 190, to the recording head 168. With the various arrangement of switches, it will be appreciated that maximum flexibility is provided for the system. Recordings made on a given track can be reproduced by the first head in the longitudinally spaced set associated with that track, erased by the intermediate head and then redeposited on the same track in combination with sounds from other tracks or other sources through the last head in the longitudinally spaced set of heads associated with that given track.

In the above description, in the interest of clarity, the reference is made to the recording of sound information as recorded and reproduced in relation to and on the same medium with magnetic video recordings. It will be understood that the apparatus and method according to the present invention has similar utility in the parallel recording on and reproduction from separate longitudinal areas or tracks, on a common magnetic strip of visually reproducible video intelligence, solely or in combination with sound and/or other intelligence, and the recording and reproduction of scientific data or other forms of usable intelligence.

As this invention may be embodied in several forms without departing from the spirit or essential characteristics thereof, the present embodiment is therefore illustrative and not restrictive.

What is claimed is:

1. A method for accomplishing a fresh sound record from a plurality of sound sources in synch-ronized relationship with a dynamic visual record, as a motion picture, comprising the steps of:
   providing said dynamic visual image record as a video signal;
   recording said video signal in one track of a continuous recording medium;
   providing a plurality of short segments of composite audio signals representative of said sound sources for said fresh sound record;
   recording said short segments of audio signals in a plurality of other tracks of said continuous medium to obtain such short segments of audio signals in staggered relationship sequentially along said medium and in coordinated relationship to each other and to said video signal in said one track; and
   transferring said short segments of audio signals from said other tracks for combination as a single record, synchronized with said visual record.

2. A method according to claim 1 further including the step of recording cue signals in a synchronizing track of said continuous medium and utilizing said cue signals to coordinate said audio signal in recording said audio signal.

3. A method according to claim 1 wherein said signals are magnetically recorded on said continuous medium.

4. A method according to claim 1 further including the steps of providing sync signals for said dynamic visual record and recording said sync signals in a sync track of said continuous medium.

5. A method according to claim 1 wherein said step of recording said audio signal includes the step of viewing said dynamic visual record for attaining synchronization therewith.

6. A method according to claim 1 wherein at least one of said audio signals is provided as a representation of a language that is foreign to that of the original sound record recorded with said dynamic visual record.

7. Apparatus for sequencing and compiling audio information on a single magnetic tape for providing a motion picture sound track in synchronized relationship to a picture sequence, comprising:
- means for defining a plurality of recording tracks on said magnetic tape;
- means for recording and reproducing video signals in one of said tracks, representative of said picture sequence;
- means for recording and reproducing audio signals in a plurality of other of said tracks representative of said audio information;
- means for indicating cue information from one of said plurality of tracks;
- means for manifesting video and audio signals from said tracks as sound and picture;
- means for mixing audio signals from said plurality of other of said tracks to provide a composite audio signal; and
- means for recording said composite audio signal in another sound-recording track.

* * * * *